US012812224B2

(12) United States Patent
Shimono

(10) Patent No.: US 12,812,224 B2

(45) Date of Patent: Nov. 24, 2026

(54) IMAGING DEVICE, DISPLAY SYSTEM, AND VEHICLE

(71) Applicant: KYOCERA Corporation, Kyoto (JP)

(72) Inventor: Takahiro Shimono, Namerikawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/864,385

(22) PCT Filed: Jun. 1, 2023

(86) PCT No.: PCT/JP2023/020520

§ 371 (c)(1),
(2) Date: Nov. 8, 2024

(87) PCT Pub. No.: WO2023/234401

PCT Pub. Date: Dec. 7, 2023

(65) Prior Publication Data

US 2025/0310622 A1 Oct. 2, 2025

(30) Foreign Application Priority Data

Jun. 1, 2022 (JP) ................................ 2022-089758

(51) Int. Cl.
*H04N 23/52* (2023.01)

(52) U.S. Cl.
CPC .................................. *H04N 23/52* (2023.01)

(58) Field of Classification Search
CPC ...................................................... H04N 23/52
See application file for complete search history.

(56) References Cited

U.S. PATENT DOCUMENTS

| | | | | |
|---|---|---|---|---|
| 7,019,374 | B2 | 3/2006 | Kayanuma et al. | |
| 11,754,911 | B2 | 9/2023 | Abe | |
| 2021/0103120 | A1* | 4/2021 | Lee | G02B 13/16 |
| 2021/0302772 | A1* | 9/2021 | Mugiraneza | G06F 3/0416 |
| 2022/0057694 | A1* | 2/2022 | Park | G03B 30/00 |
| 2022/0159160 | A1 | 5/2022 | Abe | |
| 2022/0229263 | A1* | 7/2022 | Hwang | G02B 7/021 |
| 2022/0236513 | A1* | 7/2022 | Kim | G02B 7/021 |
| 2022/0334455 | A1 | 10/2022 | Abe | |

(Continued)

FOREIGN PATENT DOCUMENTS

| | | |
|---|---|---|
| JP | 2005-064591 A | 3/2005 |
| JP | 2008-211378 A | 9/2008 |
| JP | 2010-278603 A | 12/2010 |

(Continued)

*Primary Examiner* — Michael Lee

(74) *Attorney, Agent, or Firm* — Studebaker Brackett PLLC

(57) ABSTRACT

An imaging element includes a heating element, a lens unit, a heat transfer element, and a first heat exchanger plate. The heat transfer element is interposed between the heating element and the lens unit. Heat is transferred from the heating element to the heat transfer element. The first heat exchanger plate is interposed between the lens unit and the heat transfer element. The first heat exchanger plate includes a first main surface in contact with the heat transfer element and a second main surface in contact with the lens unit. A first contact area between the first heat exchanger plate and the heat transfer element is larger than a second contact area between the first heat exchanger plate and the lens unit.

20 Claims, 9 Drawing Sheets

(56) References Cited

U.S. PATENT DOCUMENTS

2022/0357572 A1 * 11/2022 Huang .................. G02B 7/021

FOREIGN PATENT DOCUMENTS

| | | | |
|---|---|---|---|
| JP | 2017-184035 | A | 10/2017 |
| JP | 2017-198754 | A | 11/2017 |
| JP | 2021-057628 | A | 4/2021 |
| JP | 2022-070434 | A | 5/2022 |
| JP | 2023-076018 | A | 6/2023 |

* cited by examiner

IMAGING DEVICE, DISPLAY SYSTEM, AND VEHICLE

CROSS-REFERENCE TO RELATED APPLICATIONS

The present application claims priority of Japanese Patent Application No. 2022-089758 filed to Japan on Jun. 1, 2022, and an entire disclosure of this application is incorporated herein for reference.

TECHNICAL FIELD

The present disclosure relates to an imaging device, a display system, and a vehicle.

BACKGROUND OF INVENTION

A known imaging device includes a heating element and a lens unit (see Patent Literature 1).

CITATION LIST

Patent Literature

Patent Literature 1: Japanese Unexamined Patent Application Publication No. 2005-64591

SUMMARY

Solution to Problem

In an embodiment, an imaging device includes a heating element, a lens unit, a heat transfer element, and a first heat exchanger plate. The heat transfer element is interposed between the heating element and the lens unit and is configured to receive heat transferred from the heating element. The first heat exchanger plate is interposed between the lens unit and the heat transfer element, and includes a first main surface in contact with the heat transfer element and a second main surface in contact with the lens unit. A first contact area between the first heat exchanger plate and the heat transfer element is larger than a second contact area between the first heat exchanger plate and the lens unit.

DESCRIPTION OF EMBODIMENTS

Description is made hereinafter to an imaging device according to an embodiment of the present disclosure with reference to the drawings.

Figure 1:
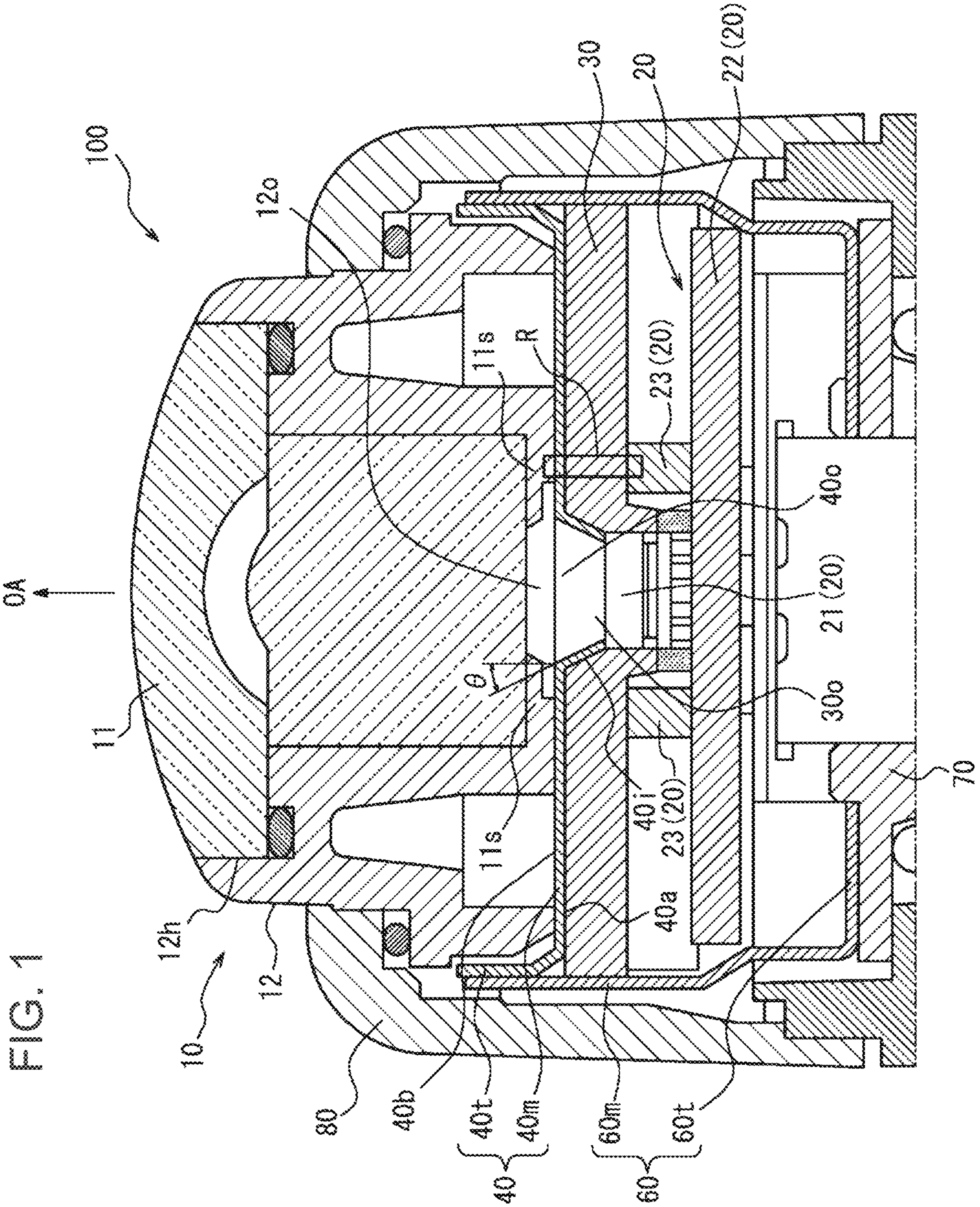
FIG. 1 is a sectional view of an imaging device according to a first embodiment.
Figure 2:
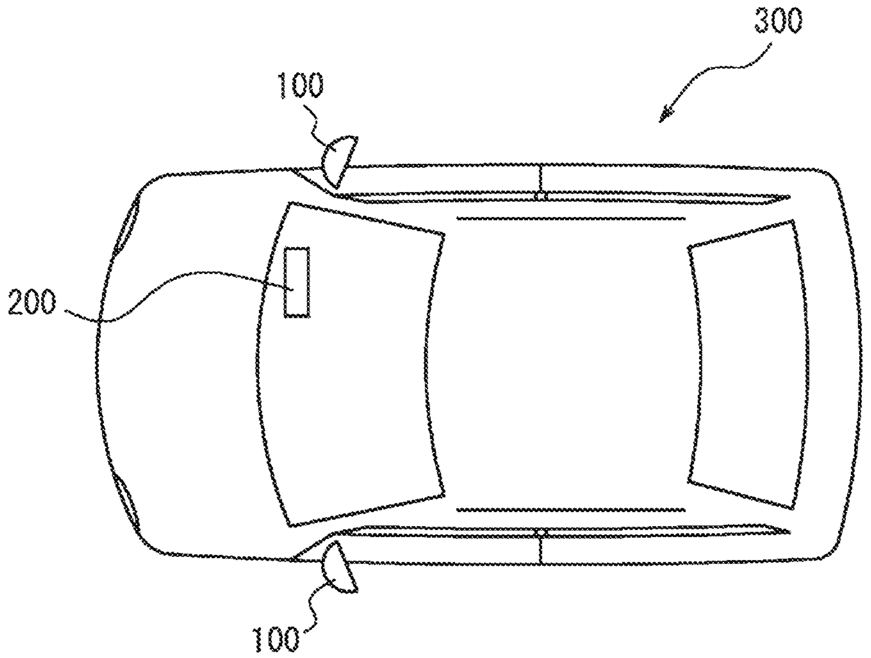
FIG. 2 is a plan view of a display system and a vehicle according to the first embodiment.

FIG. 1 is a sectional view of an imaging device according to a first embodiment. Examples of an imaging device 100 include an onboard camera. The imaging device 100 and a display device 200 may be mounted on a vehicle 300 (see FIG. 2). The imaging device 100 may exemplarily be fixed to a sideview mirror of the vehicle 300 in order to capture a peripheral image of a rear field of view. The display device 200 may be disposed visibly from a driver's sheet. The imaging device 100 and the display device 200 may constitute a display system.

The imaging device 100 includes a lens unit 10, a heating element 20, a heat transfer element 30, and a heat exchanger plate (first heat exchanger plate) 40. The imaging device 100 may further include a second heat exchanger plate 60.

The following description assumes that a direction from "rear" to "front" corresponds to a direction that is parallel to an optical axis OA of the lens unit 10 illustrated in FIG. 1 and that is directed from the imaging device 100 toward a subject (the direction indicated by an arrow of the optical axis OA).

The lens unit 10 may include an imaging optical system 11 and a lens barrel 12.

The imaging optical system 11 may form a subject image within an imaging field of view onto an imaging element 21. The imaging optical system 11 may include at least one optical element. The imaging optical system 11 may be designed and formed to satisfy desired optical characteristics such as focal length and focal depth. The optical element may include a lens, a diaphragm, and a mirror.

The lens barrel 12 may have a tubular shape. The lens barrel 12 includes a retentive hole **12*h* that is defined by an inner circumferential surface of the tubular-shaped lens barrel 12 and that may accommodate the imaging optical system 11. The lens barrel 12 includes a rear edge that may be provided with a retentive part 11*s* having a ring shape and fixing the imaging optical system 11. The lens barrel 12 may retain the imaging optical system 11 such that the optical axis OA of the imaging optical system 11 passes through the center of an opening 120 defined by the ring-shaped retentive part 11*s*. The opening 120 may allow passage of a light flux incident on the imaging optical system 11. The lens barrel 12** may be a resin member.

The heating element 20 may be configured to generate heat directly or indirectly when the imaging device 100 is driven. The heating element 20 may exemplarily include an electronic component 23 and a substrate 22 mounting the electronic component 23. The heating element 20 may exemplarily include the imaging element 21. The electronic component 23 mounted on the substrate 22 has a mounting height that can be varied in accordance with a type of the electronic component 23.

The imaging element 21 may be disposed behind the lens unit 10. The imaging element 21 may capture a subject image formed on a light receiving surface through the lens unit 10 and convert the subject image to an electrical signal to be outputted. Examples of the imaging element 21 may include CCD (charge coupled device) and CMOS (complementary metal oxide semiconductor) image sensors. The imaging device 100 may transmit an image signal based on the electrical signal from the imaging element 21 to a device such as a display device disposed outside the imaging device 100. The image signal may be the electrical signal itself outputted from the imaging element 21 or may be a signal obtained through necessary image processing by the electronic component 23.

The substrate 22 may mount the electronic component 23. The substrate 22 may be constituted by a single substrate or a plurality of substrates. The plurality of substrates can easily satisfy size restriction so as to be accommodated in the imaging device 100. The electronic component 23 may be configured to drive the imaging element 21, process an image signal, or the like.

The heat transfer element 30 is interposed between the heating element 20 and the lens unit 10. Heat is transferred from the heating element 20 to the heat transfer element 30. The heat transfer element 30 may include an opening (first opening) 300. The heat transfer element 30 may be in contact with the heating element 20 at an end (inner circumferential surface) of the first opening 300. The heat transfer element 30 is disposed in the imaging device 100 such that the optical axis OA of the imaging optical system 11 is positioned inside the first opening 300. The first opening 300 may allow passage of the light flux incident on the imaging optical system 11. The heat transfer element 30 may be solid or liquid. The heat transfer element 30 may be an elastic solid. The following description assumes that the heat transfer element 30 is an elastic solid unless otherwise specified. The heat transfer element 30 may be a highly heat conductive resin such as a silicone resin. The heat transfer element 30 may be a carbon-based highly heat conductive resin. When the carbon-based highly heat conductive resin is adopted as the heat transfer element 30, the heat transfer element 30 has heat conductivity in an in-plane direction, which can be higher than heat conductivity in a thickness direction.

The heat exchanger plate 40 is interposed between the lens unit 10 and the heat transfer element 30. The heat exchanger plate 40 may be made of a material having higher heat transfer characteristics in comparison to the heat transfer element 30, and may contain a metal such as aluminum, nickel silver, or copper. The heat exchanger plate 40 made of a metal can have lower electromagnetic interference. The heat exchanger plate 40 made of a metal can have higher electromagnetic compatibility.

The heat exchanger plate 40 may alternatively be made of an elastic solid material. The heat exchanger plate 40 may be a highly heat conductive resin such as a silicone resin. The heat exchanger plate 40 obtained by resin molding facilitates manufacture of the heat exchanger plate 40 having a complex shape.

The heat exchanger plate 40 may include a body **40*m* and a tip portion 40*t*. The tip portion 40*t* may be continuous from at least part of an outer edge of the body 40*m*. The tip portion 40*t* may be formed by bending the body 40*m* to one side of a main surface. In the present application, the main surface means a surface having the maximum area of a rectangular parallelepiped plate. As to be described later, the body 40*m* may include a convex portion or a concave portion. In a structure including an uneven surface, a main surface means a surface having the maximum area assuming that the uneven surface is macroscopically flat. The body 40*m* may include an opening (second opening) 400** positioned near the center of the body.

The heat exchanger plate 40 may be disposed in the imaging device 100 such that the main surface (e.g., a main surface **40*b*) of the body 40*m* is perpendicular to the optical axis OA of the imaging optical system 11. The heat exchanger plate 40 may be disposed in the imaging device 100 such that the tip portion 40*t* is directed to the lens unit 10**.

The heat exchanger plate 40 may extend outward beyond the lens unit 10 in the imaging device 100 when viewed in a direction along the optical axis OA. More specifically, the outer edge of the body **40*m* of the heat exchanger plate 40 may at least partially extend outward beyond the lens unit 10 in the imaging device 100. The second opening 400 of the heat exchanger plate 40 may be coaxially with the first opening 300 of the heat transfer element 30 in the imaging device 100. In such a configuration, the second opening 400 may allow passage of the light flux incident on the imaging optical system 11**.

The heat exchanger plate 40 includes a first main surface **40*a* that may be in contact with the heat transfer element 30. The heat exchanger plate 40 includes the second main surface 40*b* in contact with the lens unit 10. More specifically, the heat exchanger plate 40 may be in contact with the lens barrel 12 in the lens unit 10. A first contact area between the heat exchanger plate 40 and the heat transfer element 30 is larger than a second contact area between the heat exchanger plate 40 and the lens unit 10. Described hereinafter are a specific structure of the heat exchanger plate 40 and a specific configuration in which the heat exchanger plate 40 is in contact with the heat transfer element 30 and the lens unit 10**.

Figure 3:
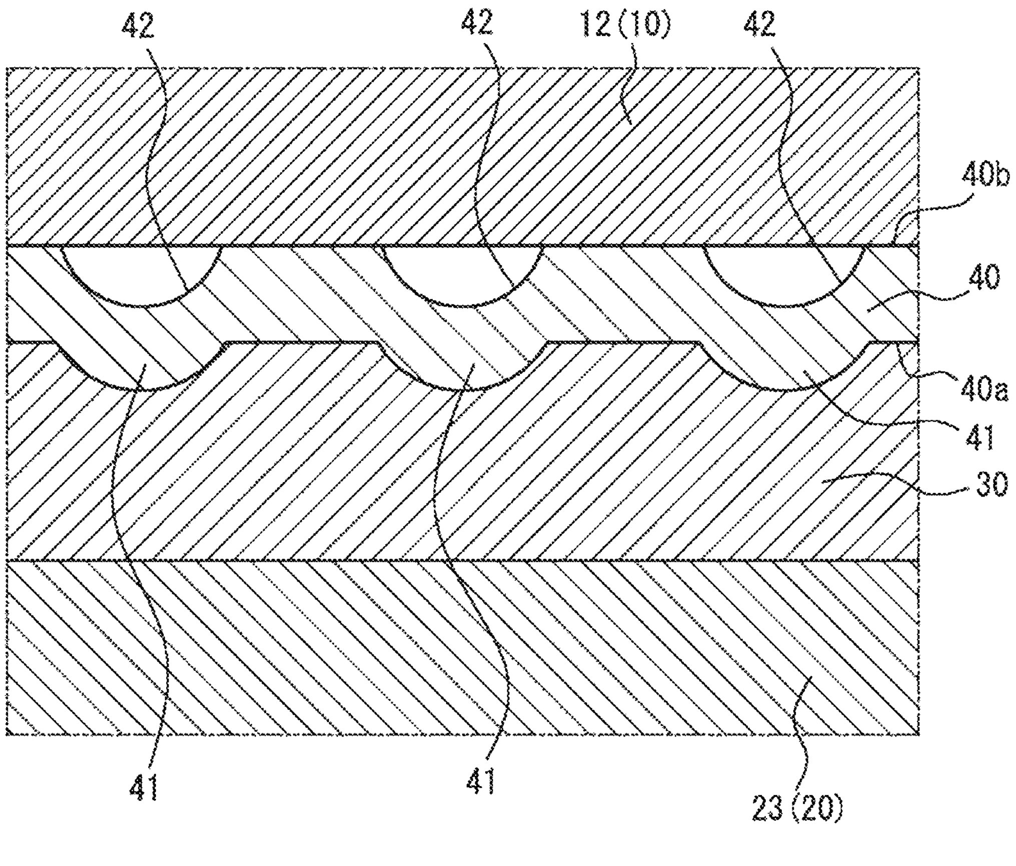
FIG. 3 is an enlarged view of a region R indicated in FIG. 1.
Figure 4:
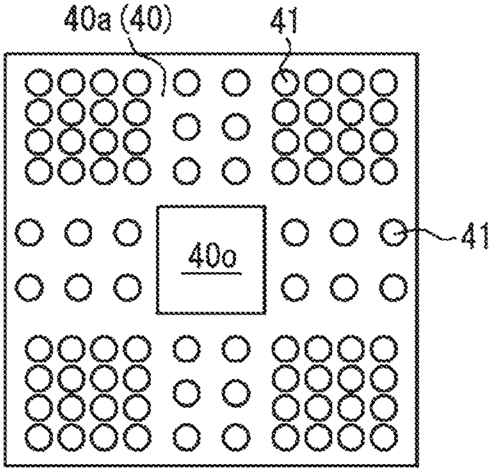
FIG. 4 is a view from a heat transfer element in FIG. 1, of an exemplary first heat exchanger plate.
Figure 5:
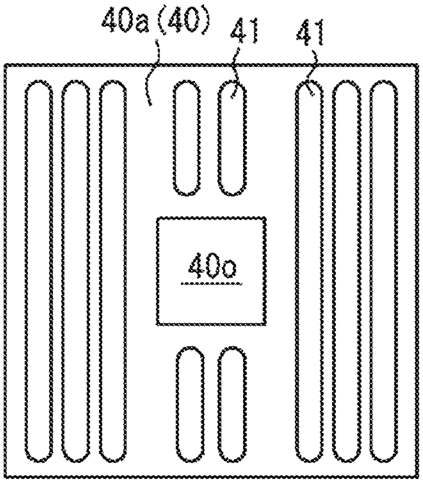
FIG. 5 is a view from the heat transfer element in FIG. 1, of another exemplary first heat exchanger plate.
Figure 6:
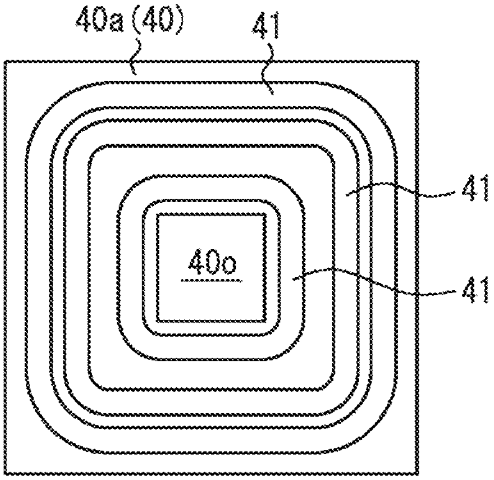
FIG. 6 is a view from the heat transfer element in FIG. 1, of still another exemplary first heat exchanger plate.

FIG. 3 is an enlarged view of a region R indicated in FIG. 1. The region R is part of a section of the imaging device 100. The region R includes part of the rear edge of the lens barrel 12, the heat exchanger plate 40, the heat transfer element 30, and the heating element (electronic component) 23. As illustrated in FIGS. 3 and 4, the heat exchanger plate 40 may include a first convex portion 41 disposed on the first main surface **40*a*. The first convex portion 41 may have a projecting shape. As illustrated in FIG. 5, the first convex portion 41 may alternatively have a segment ridge shape. As illustrated in FIG. 6, the first convex portion 41** may still alternatively have an annular ridge shape.

In a configuration in which the first convex portion 41 has a projecting shape, the heat exchanger plate 40 may include three or more first convex portions 41. The three or more first convex portions do not need to be disposed on an identical straight line. Each of the first convex portions 41 may have a hemispherical shape. The first convex portion 41 may have a circular cone shape or a polygonal cone shape including an axis perpendicular to the main surfaces **40*a* and 40*b*. The first convex portion 41 may have a semicylindrical shape or a polygonal columnar shape including an axis parallel to the main surfaces 40*a* and 40*b*. The first convex portion 41 includes an edge portion preferred to slope gently. In other words, the first convex portion 41 on the heat exchanger plate 40 may transition smoothly to the remaining portion. This configuration can reduce a gap between the heat exchanger plate 40 and the heat transfer element 30**.

In the configuration in which the first convex portion 41 has a projecting shape, the plurality of first convex portions 41 may be different in height, in other words, length in a normal direction of the main surface (the first main surface 40*a*). The height of the first convex portions 41 may differ in accordance with an interval between the heating element 20 and the heat exchanger plate 40 facing each other while interposing the heat transfer element 30. More specifically, each of the first convex portions 41 may be higher as the interval is larger. In such a configuration, the heat transfer element 30 pressed by the first convex portions 41 is deformed in accordance with the heights of the first convex portions 41 to allow a change in a projecting height of the heat transfer element 30 projecting oppositely from the first convex portions.

Figure 7:
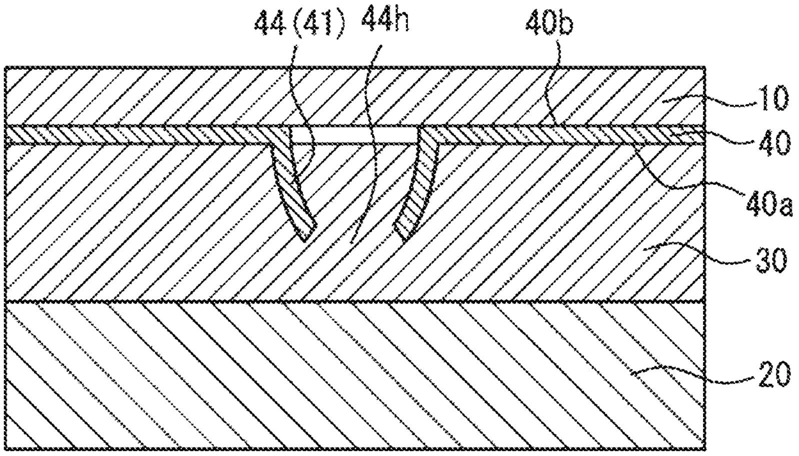
FIG. 7 is a partially enlarged view exemplifying an exemplary fourth convex portion of the imaging device according to the first embodiment.

As illustrated in FIG. 7, the first convex portion 41 may include a through-hole 44*h* penetrating from the first main surface 40*a* to the second main surface 40*b*. In other words, the heat exchanger plate 40 may include a fourth convex portion 44 provided with the through-hole 44*h*. The heat transfer element 30 may enter the through-hole 44*h*. The heat transfer element 30 may be in contact with an inner circumferential surface and an outer circumferential surface of the fourth convex portion 44. The total contact area of the heat transfer element 30 with the inner circumferential surface and the outer circumferential surface may be larger than an area of the through-hole 44*h*. In other words, the through-hole 44*h* thus formed may increase the contact area between the heat transfer element 30 and the fourth convex portion 44. The heat transfer element 30 does not need to be in contact with the lens unit 10. Upon manufacture of the imaging device according to the embodiment, the fourth convex portion 44 of the heat exchanger plate 40 may be pressed against the heat transfer element 30 and the heat transfer element 30 may expand onto the inner circumferential surface of the fourth convex portion 44.

Figure 8:
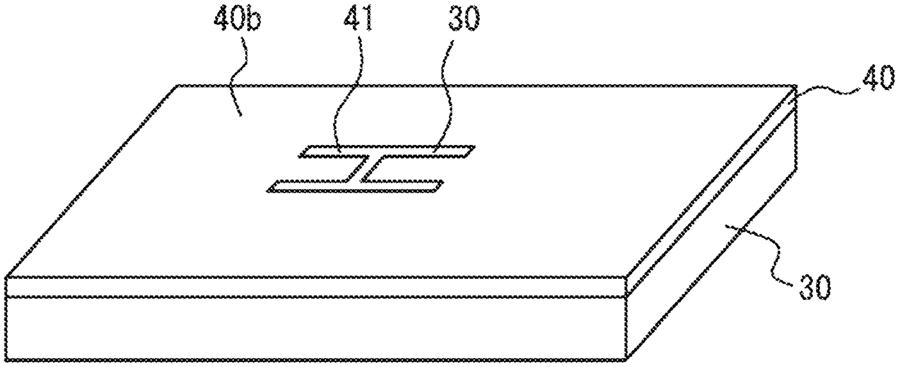
FIG. 8 is a perspective view exemplifying the first heat exchanger plate of the imaging device according to the first embodiment.

As illustrated in FIG. 8, in a configuration in which the first convex portion 41 has a segment ridge shape, the first convex portion 41 including the through-hole 44*h* may entirely have a slit shape. Upon manufacture of the imaging device according to the embodiment, the first convex portion 41 of the heat exchanger plate 40 may be pressed against the heat transfer element 30 and the heat transfer element 30 may enter the slit.

Figure 9:
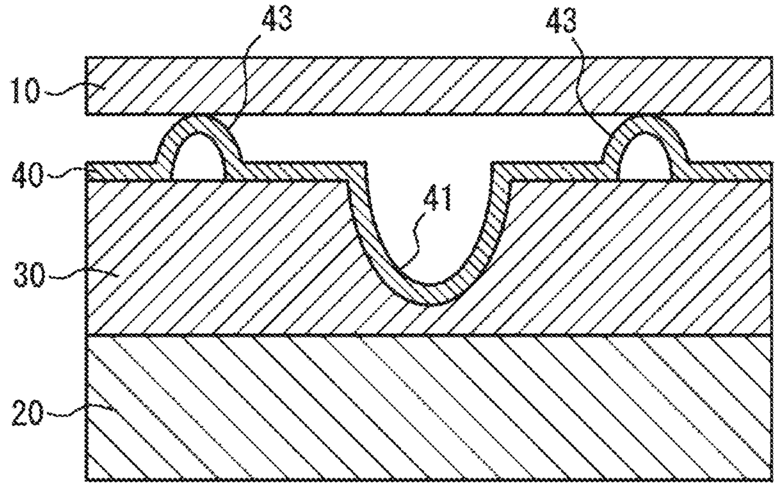
FIG. 9 is a partially enlarged view exemplifying a concave portion and second convex portions of the imaging device according to the first embodiment.
Figure 10:
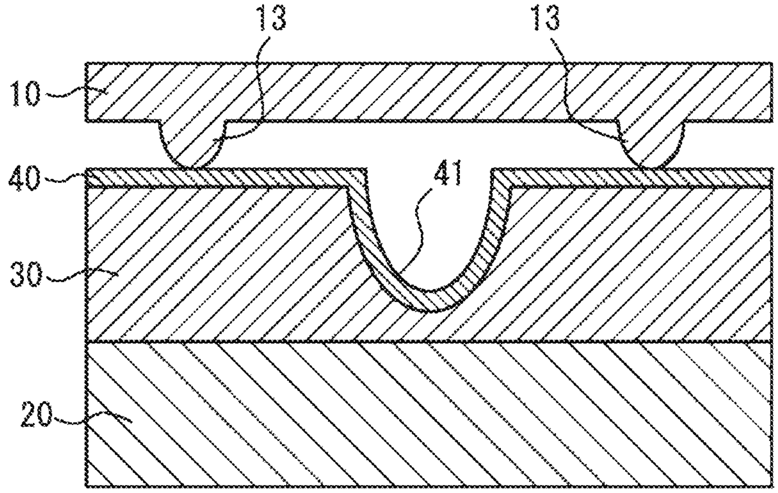
FIG. 10 is a partially enlarged view exemplifying third convex portions of the imaging device according to the first embodiment.

The heat exchanger plate 40 or the lens unit 10 may be formed to be in contact with each other such that the contact area between the heat exchanger plate 40 and the lens unit 10 is reduced on the second main surface 40*b*. As illustrated in FIG. 3, the heat exchanger plate 40 may exemplarily include a concave portion 42 disposed in the second main surface 40*b*. As illustrated in FIG. 9, the heat exchanger plate 40 may alternatively include three or more second convex portions 43 disposed on the second main surface 40*b*. The three or more second convex portions 43 do not need to be disposed on an identical straight line. Instead of the concave portion 42 or the second convex portions 43 disposed on the heat exchanger plate, the lens unit 10 may include three or more third convex portions 13 in contact with the heat exchanger plate 40 as illustrated in FIG. 10. The three or more third convex portions 13 do not need to be disposed on an identical straight line. The second and third convex portions 43 and 13 may be provided to count three or more in total.

As illustrated in FIG. 1, part of a portion near the second opening 400 of the heat exchanger plate 40 may be inclined toward the first main surface 40*a*. The part of the portion near the second opening 400 of the heat exchanger plate 40 may thus be inclined toward the heating element 20 in the imaging device 100. For example, a portion around the second opening 400 of the heat exchanger plate 40 may be bent to form an inclined portion 40*i* inclined toward the heating element 20. In a configuration in which the heat transfer element 30 is an elastic solid, the heat transfer element 30 is pressed by the heat exchanger plate 40 to allow deformation of the heat transfer element 30 according to the shape of the heat exchanger plate 40. A portion of the heat transfer element 30 near the second opening 400 can also be inclined toward the heating element 20.

The inclined portion 40*i* has an angle θ to the optical axis OA of the lens unit 10, and the angle θ may be larger than an incidence angle of a light beam passing by the diaphragm of the optical system and incident on the imaging element 21. This configuration allows the light beam passing by the diaphragm of the optical system and incident on the imaging element 21 to reach the imaging element 21 without being blocked by the heat exchanger plate 40 or the heat transfer element 30.

Figure 11:
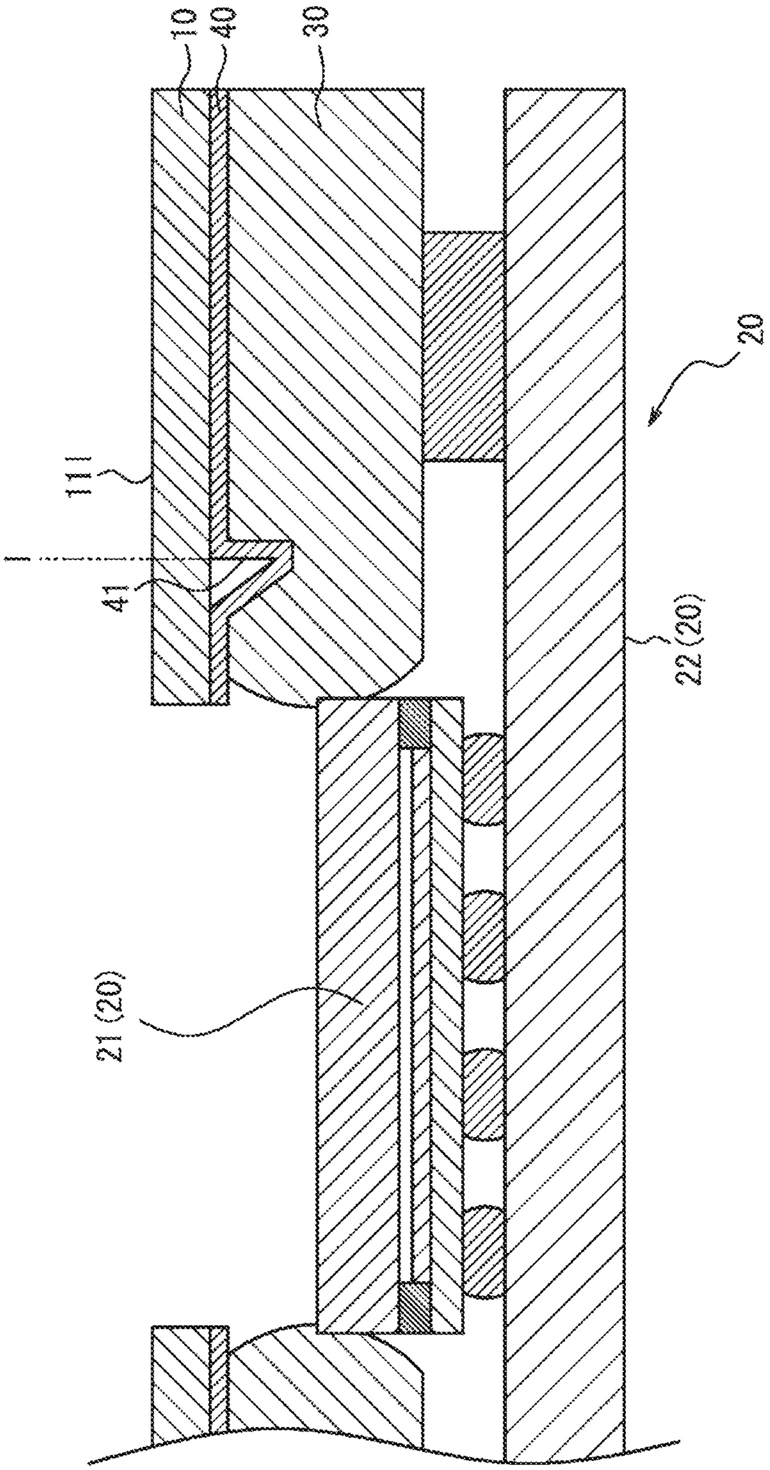
FIG. 11 is a partially enlarged view of an imaging device according to another embodiment.

As illustrated in FIG. 11, the first convex portion 41 may be asymmetric with respect to a normal line 1 of the heat exchanger plate 40 when viewed in an in-plane direction of the heat exchanger plate 40 (a direction perpendicular to the sheet of FIG. 11). In other words, the heat exchanger plate 40 may include the first convex portion (fifth convex portion) 41 that is asymmetric with respect to the normal line 1 of the heat exchanger plate 40. The first convex portion 41 has a section that may have a right-angled triangle shape. The right-angled triangle includes a side that may include the normal line 1. The right-angled triangle includes another side that may be inclined and disposed close to the imaging element 21 with respect to the normal line 1. The imaging element 21 may abut the heat transfer element 30 in the in-plane direction of the heat transfer element 30. In this configuration, the first convex portion 41 is pressed by the imaging element 21 via the heat transfer element 30 and can thus generate large elastic repulsive force. The imaging element 21 and the heat transfer element 30 are thus in more intimate contact with each other to allow heat of the imaging element 21 to be easily transferred to the heat transfer element 30.

Figure 12:
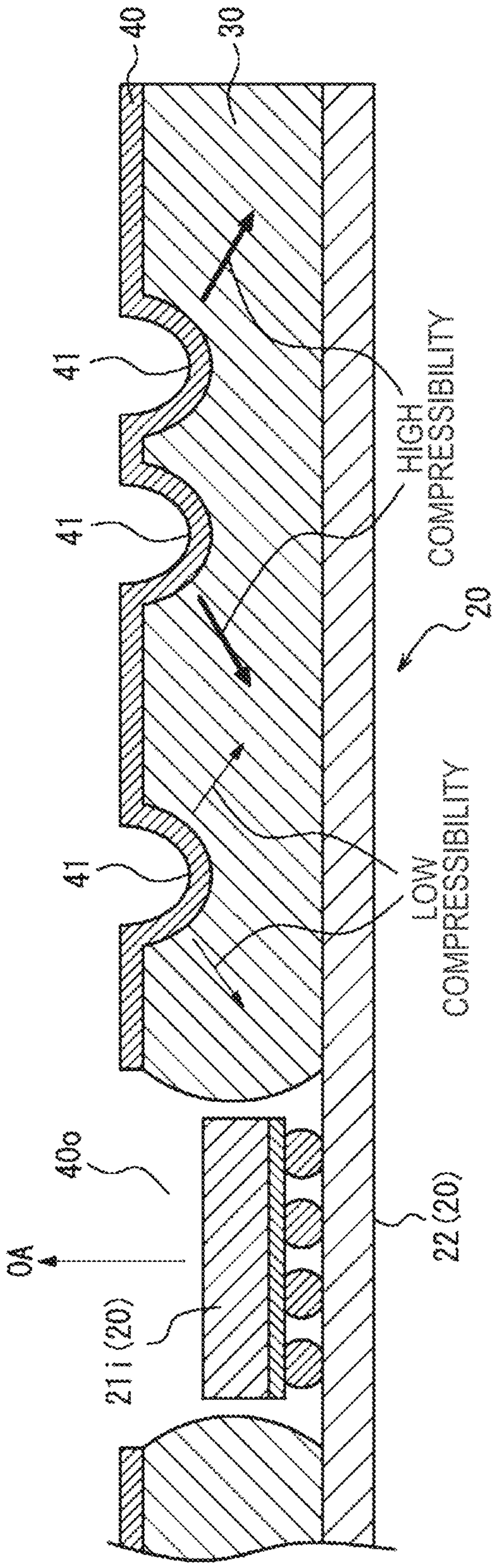
FIG. 12 is a partially enlarged view of an imaging device according to still another embodiment.

As illustrated in FIG. 12, on the first main surface 40*a*, the first convex portions (sixth convex portions) 41 may be increased in density as being away from the opening (third opening) 400 of the heat exchanger plate 40. For example, as illustrated in FIGS. 4 to 6, the first convex portions 41 may be disposed sparsely in a first region 40*f* near the opening 400. The first convex portions 41 may be disposed more densely in a second region 40*s* away from the third opening 400 than the first region 40*f*. Near the opening 400 in this configuration, the first convex portions 41 weakly press the heat transfer element 30 to reduce expansion in the in-plane direction of the heat transfer element 30. The heat transfer element 30 can thus be less likely to block the light beam passing by the diaphragm of the optical system and incident on the imaging element 21. Meanwhile, the heat transfer element 30 and the first convex portions 41 of the heat exchanger plate 40 can have a larger contact area in a region away from the opening 400. Accordingly, heat of the heat transfer element 30 can efficiently be transferred to the heat exchanger plate 40.

Alternatively, the first convex portions 41 may be disposed densely in the first region 40*f*. The first convex portions 41 may be disposed more sparsely in the second region 40*s* than the first region 40*f*. Near the opening 400 in this configuration, the contact area can be increased between the heat transfer element 30 and the first convex portions 41 of the heat exchanger plate 40. Near the heating element 20, heat of the heat transfer element 30 can thus efficiently be transferred to the heat exchanger plate 40.

As illustrated in FIG. 1, the second heat exchanger plate 60 may be in direct or indirect contact with the first heat exchanger plate 40. The second heat exchanger plate 60 may surround the electronic component (heating element) 23 in a direction crossing the optical axis OA of the lens unit 10. For example, the second heat exchanger plate 60 may surround the electronic component 23 in a direction perpendicular to the optical axis OA of the lens unit 10. In other words, the second heat exchanger plate 60 may surround the electronic component 23 around an axis parallel to the direction perpendicular to the optical axis OA of the lens unit 10. The second heat exchanger plate 60 may have a rectangular cylindrical shape or a circular cylindrical shape. Alternatively, the second heat exchanger plate 60 and the first heat exchanger plate 40 may enclose the electronic component 23.

The second heat exchanger plate 60 may include a body 60*m* and a contact portion 60*t*. The contact portion 60*t* may be continuous from the body 60*m* in a rear end portion of the imaging device 100. The contact portion 60*t* may be formed by bending the body 60*m* to one side of a main surface.

The second heat exchanger plate 60 may be disposed in the imaging device 100 such that the main surface of the body 60*m* is parallel to the optical axis OA of the imaging optical system 11. In the imaging device 100, the body 60*m* may extend backward from the heat exchanger plate 40. In this configuration, heat of the heating element 20 can be transferred in a direction away from the lens unit 10.

The body 60*m* may be fixed by an adhesive to a housing 80 of the imaging device 100. The adhesive may be made of a heat conductive material.

The contact portion 60*t* may be attached to an inner heat transfer member 70. The inner heat transfer member 70 may be disposed in a rear portion of the imaging device 100. The inner heat transfer member 70 may have heat transfer and insulating characteristics. Nonlimiting examples of the inner heat transfer member 70 can include a heat conductive sheet and a heat conductive potting material made of silicone.

The second heat exchanger plate 60 may be in contact with the tip portion 40*t* of the heat exchanger plate 40. Specifically, the body 60*m* of the second heat exchanger plate 60 may be in contact with the tip portion 40*t* of the heat exchanger plate 40. The second heat exchanger plate 60 and the tip portion 40*t* may at least partially be in contact with each other via a heat conductive material. The heat conductive material can enhance contact characteristics or heat transfer characteristics between the second heat exchanger plate 60 and the tip portion 40*t*. The heat conductive material may be solid or liquid.

Figure 13:
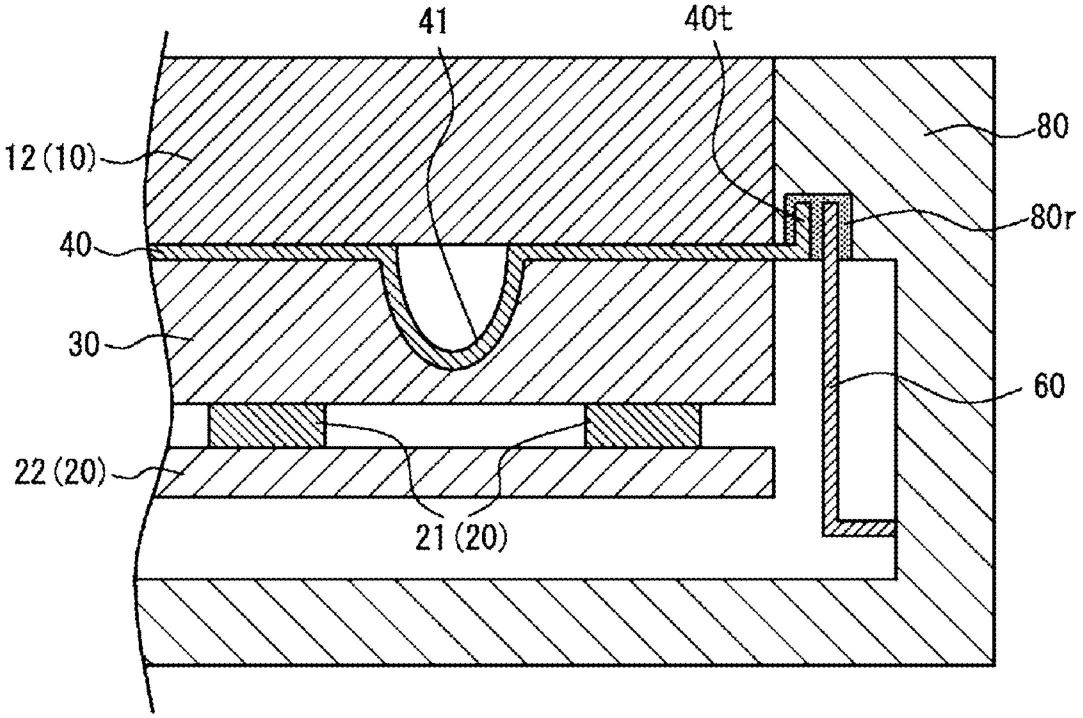
FIG. 13 is a partially enlarged view of an imaging device according to further another embodiment.

As illustrated in FIG. 13, the housing 80 may include a recess 80*r* accommodating an end of the tip portion 40*t* of the heat exchanger plate 40 and an end of the contact portion 60*t* of the second heat exchanger plate 60. Alternatively, the end of the tip portion 40*t* of the heat exchanger plate 40 may be positioned in a recess of the lens barrel 12. The recess of the housing 80 may be positioned adjacent to the heat exchanger plate 40. The recess may be filled with a heat conductive material. The heat conductive material may be a highly heat conductive resin.

In the present embodiment, the imaging device 100 includes the heat transfer element 30 and the heat exchanger plate. The heat transfer element 30 is interposed between the heating element 20 and the lens unit 10 and is configured to receive heat transferred from the heating element 20. The heat exchanger plate is interposed between the lens unit 10 and the heat transfer element 30, and includes the first main surface in contact with the heat transfer element 30 and the second main surface in contact with the lens unit 10. The first contact area between the heat exchanger plate 40 and the heat transfer element 30 is larger than the second contact area between the heat exchanger plate 40 and the lens unit 10. In the imaging device 100 thus configured, heat of the heating element 20 can be transferred to the heat exchanger plate 40 via the heat transfer element 30 with reduced heat transfer to the lens unit 10.

An imaging device mounted on a vehicle may typically be accommodated in a narrow and saved space likely to keep heat, in a sideview mirror or the like. The imaging device is required to operate stably at extremely high temperature due to addition of external environmental temperature. Furthermore, an imaging device for peripheral monitoring needs to have a wide angle of view and thus typically has short focal length. The imaging device therefore inevitably has low height to be likely to exhibit deteriorated heat radiation. Moreover, a lens surface adjacent to an object of the imaging device mounted on the vehicle is likely to be cooled by traveling wind, rain, snow, or the like, and moisture in a sagital space of a cooled lens may form dew to deteriorate visual recognition. Such a dew forming phenomenon is typically likely to occur as the lens surface adjacent to the object has higher temperature. Accordingly required are efficient heat transfer from a heating element and reduced heat transfer to a lens unit. The imaging device 100 configured as described above is effectively disposed in a saved space in a sideview mirror or the like of the vehicle.

In the imaging device 100 according to the present embodiment, the heat exchanger plate 40 extends outward beyond the lens unit 10 in a direction along the normal line 1 of the main surface (e.g., a second main surface 4*b*) of the heat exchanger plate 40. The imaging device 100 thus configured can allow heat transferred to the heat exchanger plate 40 to be transferred to a space or a substance positioned outside the lens unit 10.

In the present embodiment, the imaging device 100 includes the second heat exchanger plate 60 surrounding the heating element in a direction crossing the optical axis OA of the lens unit 10. The second heat exchanger plate 60 is in direct or indirect contact with the first heat exchanger plate 40, and the heating element corresponds to the electronic component 23. In this configuration, electromagnetic interference or electromagnetic compatibility can be improved when the first heat exchanger plate 40 or the second heat exchanger plate 60 is made of a metal.

The present invention has been described with reference to the figures and practical examples. Note that those skilled in the art can easily apply various modifications and corrections in accordance with the present disclosure. Therefore, note that these modifications and corrections are included in the scope of the present invention.

REFERENCE SIGNS

100 imaging device
10 lens unit
11 imaging optical system
11*s* retentive part
12 lens barrel
12*r* recess
120 opening
12*h* retentive hole

13 third convex portion
20 heating element
21 imaging element
22 substrate
23 electronic component
30 heat transfer element
300 first opening
40 heat exchanger plate
400 second opening, third opening
40*a*, 40*b* main surface
40*i* inclined portion
40*m* body
40*t* tip portion
41 first convex portion, fifth convex portion
42 concave portion
43 second convex portion
44 fourth convex portion
44*h* through-hole
45 slit
60 second heat exchanger plate
60*t* contact portion
60*m* body
70 inner heat transfer member
80 housing
200 display device
300 vehicle
OA optical axis
R region
l normal line
θ angle

The invention claimed is:

1. An imaging device comprising:
a heating element;
a lens unit having an optical axis;
a heat transfer element interposed between the heating element and the lens unit and configured to receive heat transferred from the heating element; and
a first heat exchanger plate interposed between the lens unit and the heat transfer element, and including a first main surface in contact with the heat transfer element and a second main surface in contact with the lens unit; wherein
a first contact area between the first heat exchanger plate and the heat transfer element is larger than a second contact area between the first heat exchanger plate and the lens unit, and
the first heat exchanger plate includes a convex portion disposed on the first main surface that extends along the optical axis towards the heat transfer element such that the convex portion is embedded in the heat transfer element.

2. The imaging device according to claim 1, wherein the first heat exchanger plate extends outward beyond the lens unit in a normal direction of a main surface of the first heat exchanger plate.

3. The imaging device according to claim 1, wherein
the convex portion is a first convex portion that has a hemispherical shape, a circular cone shape, a semicylindrical shape, a polygonal columnar shape, or a polygonal cone shape.

4. The imaging device according to claim 1, wherein
the first heat exchanger plate includes a second convex portion in contact with the lens unit, or the lens unit includes a third convex portion in contact with the first heat exchanger plate.

5. The imaging device according to claim 1, wherein
the convex portion is a fourth convex portion that includes a through-hole, and the heat transfer element is in contact with an inner circumferential surface and an outer circumferential surface of the fourth convex portion.

6. The imaging device according to claim 1, wherein
the heat transfer element includes a first opening including the optical axis of the lens unit, and
the first heat exchanger plate includes a second opening including the optical axis of the lens unit.

7. The imaging device according to claim 6, wherein
the heat transfer element is an elastic solid, and
a portion near the second opening of the first heat exchanger plate is inclined toward the heating element.

8. The imaging device according to claim 1, wherein
the heat transfer element is an elastic solid, and
the convex portion is a fifth convex portion that is asymmetric with respect to a normal line of the first heat exchanger plate in an in-plane direction of the first heat exchanger plate.

9. The imaging device according to claim 1, wherein
the first heat exchanger plate includes a third opening including the optical axis of the lens unit, and
the convex portion is a sixth convex portion that is increased in density as being away from the third opening.

10. The imaging device according to claim 1, the imaging device comprising
a second heat exchanger plate surrounding the heating element in a direction crossing the optical axis of the lens unit, wherein
the second heat exchanger plate is in direct or indirect contact with the first heat exchanger plate, and
the heating element is an electronic component.

11. A display system comprising:
the imaging device according to claim 1; and
a display device configured to display an image captured by the imaging device.

12. A vehicle comprising the imaging device according to claim 1.

13. The imaging device according to claim 2, wherein
the convex portion is a first convex portion that has a hemispherical shape, a circular cone shape, a semicylindrical shape, a polygonal columnar shape, or a polygonal cone shape.

14. The imaging device according to claim 2, wherein
the first heat exchanger plate includes a second convex portion in contact with the lens unit, or the lens unit includes a third convex portion in contact with the first heat exchanger plate.

15. The imaging device according to claim 2, wherein
the convex portion is a fourth convex portion that includes a through-hole, and the heat transfer element is in contact with an inner circumferential surface and an outer circumferential surface of the fourth convex portion.

16. The imaging device according to claim 2, wherein
the heat transfer element includes a first opening including the optical axis of the lens unit, and
the first heat exchanger plate includes a second opening including the optical axis of the lens unit.

17. The imaging device according to claim 16, wherein
the heat transfer element is an elastic solid, and
a portion near the second opening of the first heat exchanger plate is inclined toward the heating element.

18. The imaging device according to claim 2, wherein the heat transfer element is an elastic solid, and the convex portion is a fifth convex portion that is asymmetric with respect to a normal line of the first heat exchanger plate in an in-plane direction of the first heat exchanger plate.

19. The imaging device according to claim 2, wherein the first heat exchanger plate includes a third opening including the optical axis of the lens unit, and the convex portion is a sixth convex portion that is increased in density as being away from the third opening.

20. The imaging device according to claim 2, the imaging device comprising a second heat exchanger plate surrounding the heating element in a direction crossing the optical axis of the lens unit, wherein the second heat exchanger plate is in direct or indirect contact with the first heat exchanger plate, and the heating element is an electronic component.

* * * * *